J. A. CRESSEY.
CONFECTION.
APPLICATION FILED JULY 28, 1919.

1,382,601.

Patented June 21, 1921.

Inventor
J. A. Cressey.
By Jack A. Athley
Attorney the county of Dallas and State

UNITED STATES PATENT OFFICE.

JOHN A. CRESSEY, OF DALLAS, TEXAS.

CONFECTION.

1,382,601.

Specification of Letters Patent.  Patented June 21, 1921.

Application filed July 28, 1919. Serial No. 313,920.

*To all whom it may concern:*

Be it known that I, JOHN A. CRESSEY, a citizen of the United States, residing at Dallas, in the county of Dallas and State of Texas, have invented certain new and useful Improvements in Confections, of which the following is a specification.

This invention has particular relation to an article of manufacture in the nature of confection.

Confections and edibles such as popcorn, peanuts, molasses candy, sugar candy and other sweetmeats have been distributed and vended in all sorts of packages, but to my knowledge no package for containing the same has yet been eaten and no waste thereby had.

It is obvious that such a package would not only be attractive and economical, but wholesome and convenient. For instance at ball games and the like it is customary to vend popcorn, candy and peanuts in sacks and boxes. The vendor usually pitches the package up to the customer, with more or less accuracy and the purchaser throws away the container, thereby not only making for waste, but accumulating trash.

I have conceived the idea of making an edible package including an edible container filled with a confection and sealed so that it may be pitched like a ball and entirely conserved, thus avoiding waste and trash and providing an attractive and convenient article of sale.

In carrying out the invention I provide a plurality of edible sections molded in shape. These sections are filled with confections and sealed together. The sealed sections are ornamented by representations, such as stitches, thereby giving the package the appearance of a baseball or other article.

The invention will be more readily understood from a reading of the following specification and by reference to the accompanying drawings, in which an example of the invention is shown and wherein.

Figure 1:
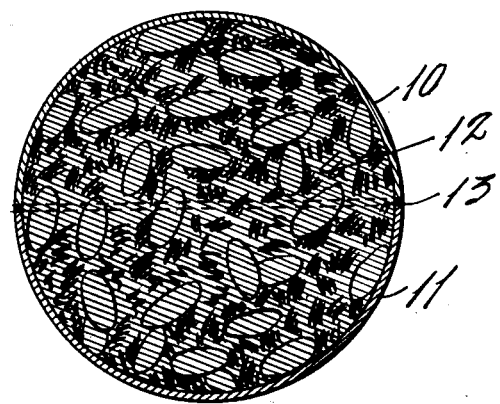
Figure 1 is a sectional view of the package.
Figure 2:
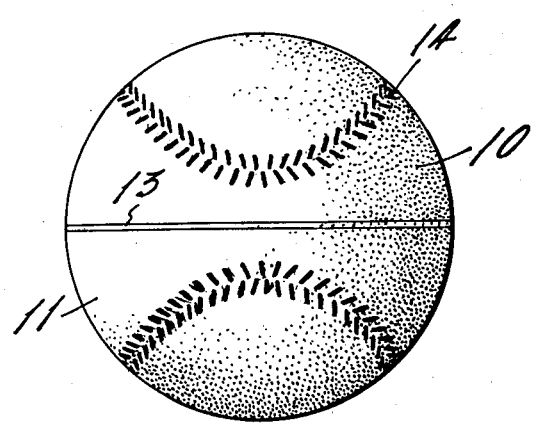
Fig. 2 is an elevation of the same.

In the drawings the numeral 10 designates one half or section, and 11, the other half or section. These sections are molded from dough and baked crisp so as to make them substantial enough to handle, yet leaving them brittle enough to be easily eaten.

The sections are filled with popcorn, candy or other confections, sweetmeats, or nuts. Thus filling 12 may be made in the form of a ball by mixing such ingredients as popcorn, split peanuts and candy with water and sugar. These edibles are pressed into shape so as to fit snugly into the halves 10 and 11, thus avoiding compressing the filling when the halves are brought together. It is obvious that the crisp sections would not stand much pressure and unless the filling was compacted, a sufficient quantity could not be inclosed. If salted peanuts are used in the filling they must be inclosed in a moisture-proof sack before being placed in the sections, as the salt would attack the sections and dissolve them.

The edges of the sections are dipped in a sealing mixture which may be composed of flour, gelatin, and water. Such a mixture would dry or set quickly and form a cement. The filling ball having been formed, the sections are placed around the same so that their edges are brought together and united by a seal 13.

After the sections are sealed suitable characters may be printed thereon to simulate stitching, thereby giving the finished article the appearance of a baseball.

It will be seen that the contents of the sections are entirely inclosed and protected. The ball shaped package is not only attractive but may be easily pitched to a purchaser and makes economy and enjoyment as it may be entirely consumed. The confection may be eaten by first breaking it in half and eating the halves and their contents separately, or it may be eaten like an apple. The article is not to be limited to a representation of a baseball as other shapes and representations may be made.

What I claim is:

1. As a new article of manufacture, an edible spherically shaped casing formed in a plurality of sections secured together, said casing comprising baked dough, said casing having markings upon its outer surface to simulate stitching, the entire casing simulating an ordinary base-ball, and an edible filling for the casing.

2. As a new article of manufacture, an edible casing formed in a plurality of sections secured together, said casing comprising a crisp baked dough, said casing having markings upon its outer surface to simulate a seam, the entire casing simulating a ball employed in playing a game, and an edible filling for the casing.

3. As a new article of manufacture, an edible casing including a pair of curved casing sections, said casing sections comprising relatively thin dough baked crisp, an edible cement securing the edges of the casing sections together, said casing having a seam formed upon its outer surface whereby the casing simulates a ball employed in playing a game, and an edible filling for the casing.

In testimony whereof I affix my signature.

JOHN A. CRESSEY.